(12) United States Patent
Hanna et al.

(10) Patent No.: US 7,010,690 B1
(45) Date of Patent: Mar. 7, 2006

(54) EXTENSIBLE SYSTEM FOR BUILDING AND EVALUATING CREDENTIALS

(75) Inventors: Stephen R. Hanna, Bedford, MA (US); Anne H. Anderson, Acton, MA (US); Yassir K. Elley, Waltham, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 947 days.

(21) Appl. No.: 09/612,057

(22) Filed: Jul. 7, 2000

(51) Int. Cl.
*H04L 9/00* (2006.01)

(52) U.S. Cl. .................................. 713/170; 713/186
(58) Field of Classification Search ............... 713/170, 713/201, 186
See application file for complete search history.

(56) References Cited

U.S. PATENT DOCUMENTS 5,546,523 A * 8/1996 Gatto ......................... 345/811

* cited by examiner

*Primary Examiner*—Gregory Morse
*Assistant Examiner*—Jacob Lipman (74) *Attorney, Agent, or Firm*—Kudirka & Jobse, LLP (57) ABSTRACT

A method and apparatus for authenticating and authorizing a user of a device connected to a network. In one embodiment, a set of credential descriptors is generated that describes credentials that must be built for authenticating the user. The set of credential descriptors is provided to a first device, which includes a first master credential builder for building credentials corresponding to at least one of the credential descriptors. In the event that the first master credential builder does not build all of the credentials corresponding to the set of credential descriptors, another set of credential descriptors is provided to a second device, which includes a second master credential builder for building at least one credential remaining to be built. This process continues until all credentials have been built or a determination is made that they cannot be built. After all credentials have been built, the credentials are provided to a master credential evaluator, which may be included in the first device, the second device, or another device. If the master credential evaluator successfully evaluates the built credentials, then user authentication is completed. Advantageously, credential builders and credential evaluators can be added to or removed from the master credential builders and the master credential evaluator, respectively, to allow dynamic modification of the master credential builders and the master credential evaluator to suit specific and changing requirements for user authentication/authorization.

18 Claims, 4 Drawing Sheets

EXTENSIBLE SYSTEM FOR BUILDING AND EVALUATING CREDENTIALS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to systems and techniques for authenticating and authorizing users of computers and other computerized devices connected to a network.

Computers and other computerized devices are frequently used in networked configurations. Computer networks advantageously allow multiple users operating respective computers to share information, access services provided by other devices connected to the network, and/or share hardware resources such as mass storage systems, printers, and facsimile machines.

For example, computers may be connected to a local area network (LAN), which generally allows a relatively small number of computers in a limited area to share information and access services/resources. Computers that are connected to a common LAN typically belong to the same group.

Further, computers may be connected to respective LANs, thereby defining multiple groups of computers. These LANs may also be linked together by way of, e.g., a wide area network (WAN) and/or the Internet, thereby allowing some or all of the relatively small number of computers in each group to share information and access services/resources.

Computers and other computerized devices, whether they are connected to a LAN and/or part of a larger WAN, also frequently have access to external networks, e.g., the Internet. For example, in a so-called "open" network configuration, all computers connected to an internal network typically have direct access to the external network. Alternatively, a specialized computer, sometimes called a "gateway" computer, may be interposed between the internal network and the external network, thereby requiring the computers connected to the internal network to access the external network indirectly by way of the gateway computer.

Although computer networks provide numerous advantages in facilitating the sharing of information and the accessing of services/resources between multiple users, computer networks have drawbacks in that they are subject to security breaches. For example, computers assigned to respective groups often share common access privileges relative to, e.g., specific files, directories, databases, web pages, and other services/resources. It is therefore desirable to authenticate users to ensure that, e.g., the users belong to particular groups and therefore have the requisite privileges for accessing the desired service/resource. In this way, unauthorized users can be prevented from accessing restricted information, services, and/or resources on the computer network; and, the security of the restricted information, services, and/or resources can be maintained.

Not only is it desirable to authenticate users to ensure that the users have the requisite access privileges, but it is also desirable to perform user authentication to ensure that any message and/or data transmitted by a user in fact originated with that user, and was not intentionally or inadvertently modified during the transmission through the network to its destination. In this way, the integrity of any message/data transmissions on the computer network can be maintained.

User authentication is conventionally performed on a computer network as follows. First, a user operating a client computer initiates a connection with a server computer via the network, e.g., for accessing a service/resource provided by the server computer.

Next, if access to the service provided by the server computer is restricted, then, instead of immediately accepting the connection, the server computer transmits a message to the client computer that includes information about what the client computer must do to authenticate the user.

For example, a secure channel for transmitting messages/data between the client and server computers over the network may be set up using the well-known Secure Socket Layer (SSL) protocol. Specifically, the client and server computers execute SSL routines, which set up the secure channel through the network using, e.g., public-private key pair cryptography techniques for encrypting/decrypting transmitted messages/data and digital signatures for user authentication.

More specifically, using the SSL protocol, the server computer typically transmits a message to the client computer that includes a request for a certification path (i.e., a "certpath") from the server computer to the client computer. For example, the message transmitted by the server computer may include a certificate request message, which typically includes a list of acceptable certificate types and a list of acceptable certificate authorities.

Accordingly, in order to authenticate the user, the client computer transmits a message to the server computer that includes a certpath from the server computer to the client computer that conforms to the lists of acceptable certificate types and authorities. That certpath from the server computer to the client computer is regarded as the client computer's "credentials" (i.e., "certpath" credentials) to the server computer.

Finally, the server computer evaluates the credentials transmitted by the client computer; and, if they satisfy the certificate request message, then the user is properly authenticated and authorized, and the server computer subsequently provides the requested service/resource to the client computer.

However, such conventional techniques for providing user authentication in computer networks have drawbacks. For example, the SSL protocol generally requires the client computer to build certpath credentials, thereby providing an indication of the certpath from the server computer to the client computer for authenticating the user. But, in some applications, the client computer may be incapable of building the required certpath credentials, even though it might be capable of building other types of credentials. Similarly, the server computer may be incapable of evaluating such certpath credentials, even though it might be capable of evaluating other types of credentials. Further, because the SSL protocol generally deals only with certpath credentials, in some applications, it may be incapable of providing a full set of credentials from the client computer to the server computer, thereby providing a definitive indication of the access privileges of the user.

In addition, even though client computers normally request access to services/resources from server computers via a network, and the server computers normally provide the requested information and/or services to the client computers, in some applications, the server computers may at least temporarily take on the role of clients and/or the client computers may at least temporarily take on the role of servers. However, these computers using conventional techniques such as the SSL protocol may be incapable of building and/or evaluating all of the different types of credentials required for authenticating users in their dual roles as clients and servers.

It would therefore be desirable to have improved systems and techniques for authenticating and authorizing users of computers and other computerized devices connected to a network that are extensible to permit incorporation of new and/or different types of credentials, credential builders, and/or credential evaluators. It would also be desirable to have improved systems and techniques for authenticating and authorizing users that provide for secure communications between any computers connected to a network, thereby allowing any computer on the network to request credentials from any other computer accessible via the network for user authentication/authorization.

BRIEF SUMMARY OF THE INVENTION

Consistent with the present invention a method and apparatus are disclosed for authenticating and authorizing a user of a device connected to a network. Such user authentication/authorization is accomplished by way of extensible resources for building and evaluating credentials.

In one embodiment, a plurality of credential descriptors is generated for the user's device, which is a client computer. These credential descriptors are then provided to a first master credential builder, which is included in either the client computer or a server computer. Credentials are then built corresponding to at least one of the credential descriptors using the first master credential builder. Next, in the event that there is at least one credential remaining to be built, at least one credential descriptor corresponding thereto is provided to a second master credential builder, which is included in a computer different from that which includes the first master credential builder. Credentials are then built corresponding to at least one of these credential descriptors using the second master credential builder. In the event that there are no credentials remaining to be built, the credentials built by the first and second master credential builders are then provided to a master credential evaluator, which is included in either the computer with the first master credential builder or the computer with the second master credential builder. Next, the master credential evaluator evaluates the built credentials, thereby determining whether the built credentials satisfy the original set of credential descriptors. In another embodiment, a set of credential descriptors corresponding to credentials remaining to be built are provided to a third master credential builder, which is included in a computer different from the client and server computer.

In the foregoing manner, a negotiated dialogue can be initiated and maintained between a plurality of computers over the network for building and evaluating credentials for use in authenticating a user.

The first and second master credential builders may be modified by adding (removing) credential builders to (from) the first and second master credential builders. Similarly, the master credential evaluator may be modified by adding (removing) credential evaluators to (from) the master credential evaluator.

In the foregoing manner, the first and second master credential builders and the master credential evaluator, which are modifiable resources, are adapted to suit specific requirements for authenticating and authorizing the user.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
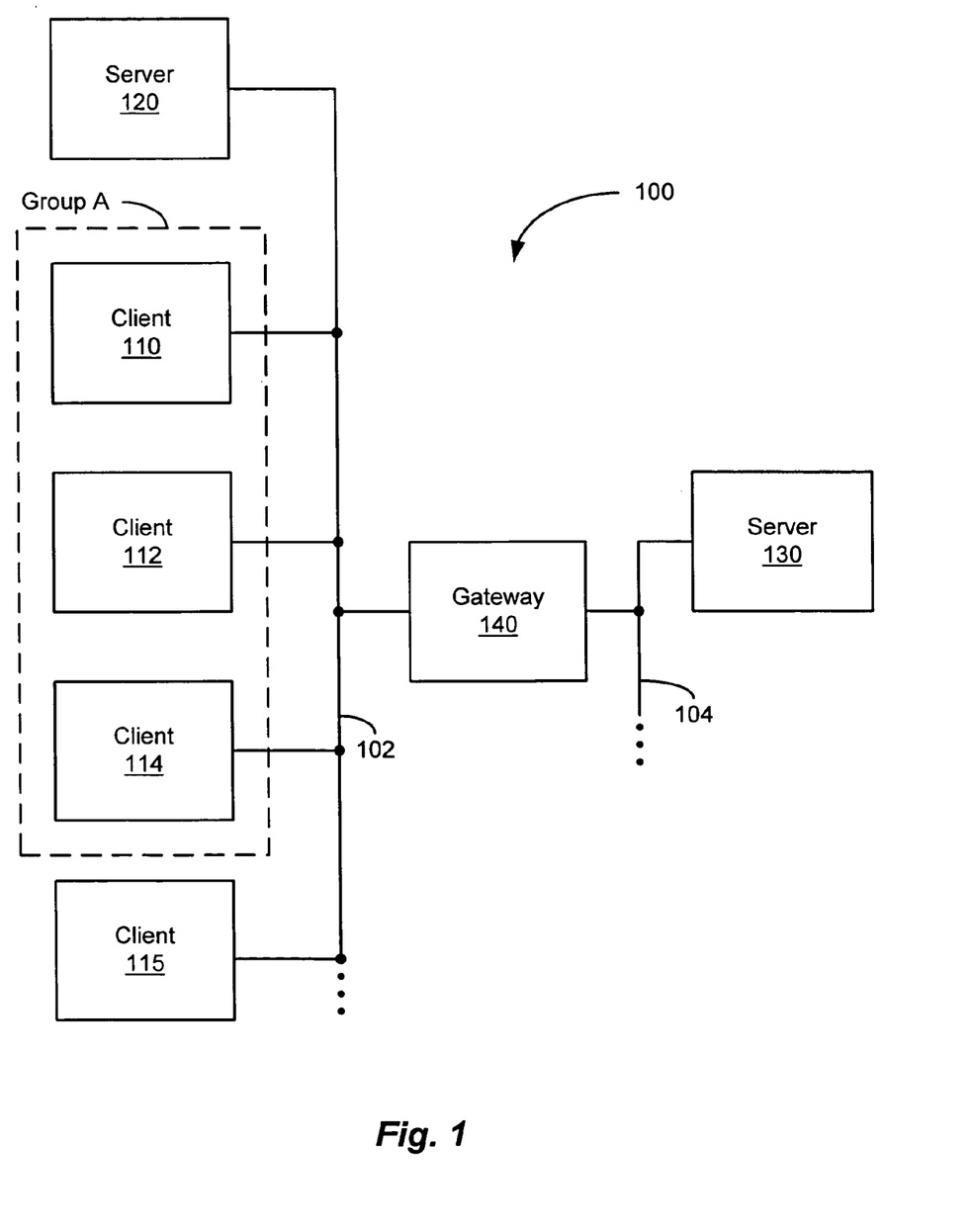
FIG. 1 is a block diagram depicting a computer network operative in a manner consistent with the present invention.

FIG. 1 depicts an illustrative embodiment of a computer network 100 that is operative in a manner consistent with the present invention. Specifically, the computer network 100 includes a plurality of client computers, e.g., client computers 110, 112, 114, and 115 operatively connected to a network 102. In this illustrative embodiment, the client computers 110, 112, and 114 are regarded as belonging to the same Group A (see FIG. 1).

The network 102 allows human operators ("users"; not shown) of the client computers 110, 112, 114, and 115 to share and/or exchange information, and/or share hardware resources (not shown) connected to the network 102 such as mass storage devices, printers, and facsimile machines. Those of ordinary skill in the art will appreciate that the term "users" may further comprise processes executing on the client computers 110, 112, 114, and 115, data processing agents, or other computer resources in addition to human operators.

The computer network 100 further includes at least one server computer, e.g., a server computer 120, operatively connected to the network 102, thereby allowing the users of the client computers 110, 112, 114, and 115 to access services/resources provided by the server computer 120. Still further, the computer network 100 includes at least one server computer, e.g., a server computer 130, connected to a network 104.

The networks 102 and 104 may comprise a Local Area Network (LAN), a Wide Area Network (WAN), the Internet, or any other network suitable for authenticating and authorizing users of computers and other computerized devices connected to the networks 102 and 104. Further, respective segments of the networks 102 and 104 may comprise lengths of contiguous wire, optical fiber, or coaxial cable. Alternatively, the network 102 and/or the network 104 may comprise a wireless network.

Each of the client computers 110, 112, 114, and 115, and the server computers 120 and 130, includes at least one memory (not shown) such as a ROM and/or a RAM, e.g., for storing operating systems, application software modules, and/or executable scripts; and, at least one processor (not shown), e.g., for processing user inputs, for initiating and controlling connections to the networks 102 and 104, for executing applications or executable scripts, and/or for controlling access to services/resources.

For example, various types of services/resources may be made available to the user once the requirements for user authentication/authorization have been satisfied. By way of example, and not limitation, a user may be permitted to pass through a locked doorway upon presentation of a proper credential(s), may be permitted to operate prescribed machinery, may be permitted access to certain resources within a computer system such as files, directories, databases or any other computer resource, or may be permitted access to or the right to modify, a web page. In addition, members of one group may be provided only read privileges for certain computer resources while members of another group may be provided read/write privileges. It should be appreciated that once the technique for authenticating and authorizing users of computers and other computerized devices is understood, the presently described technique may be employed in any application in which it is desired to perform user authentication/authorization.

The networks 102 and 104 are operatively linked by a gateway computer 140, which similarly includes at least one memory (not shown) and at least one processor (not shown), thereby permitting the client computers 110, 112, 114, and 115 and/or the server computer 120 connected to the network 102 to access the server computer 130 connected to the network 104 by way of the gateway computer 140.

Figure 2:
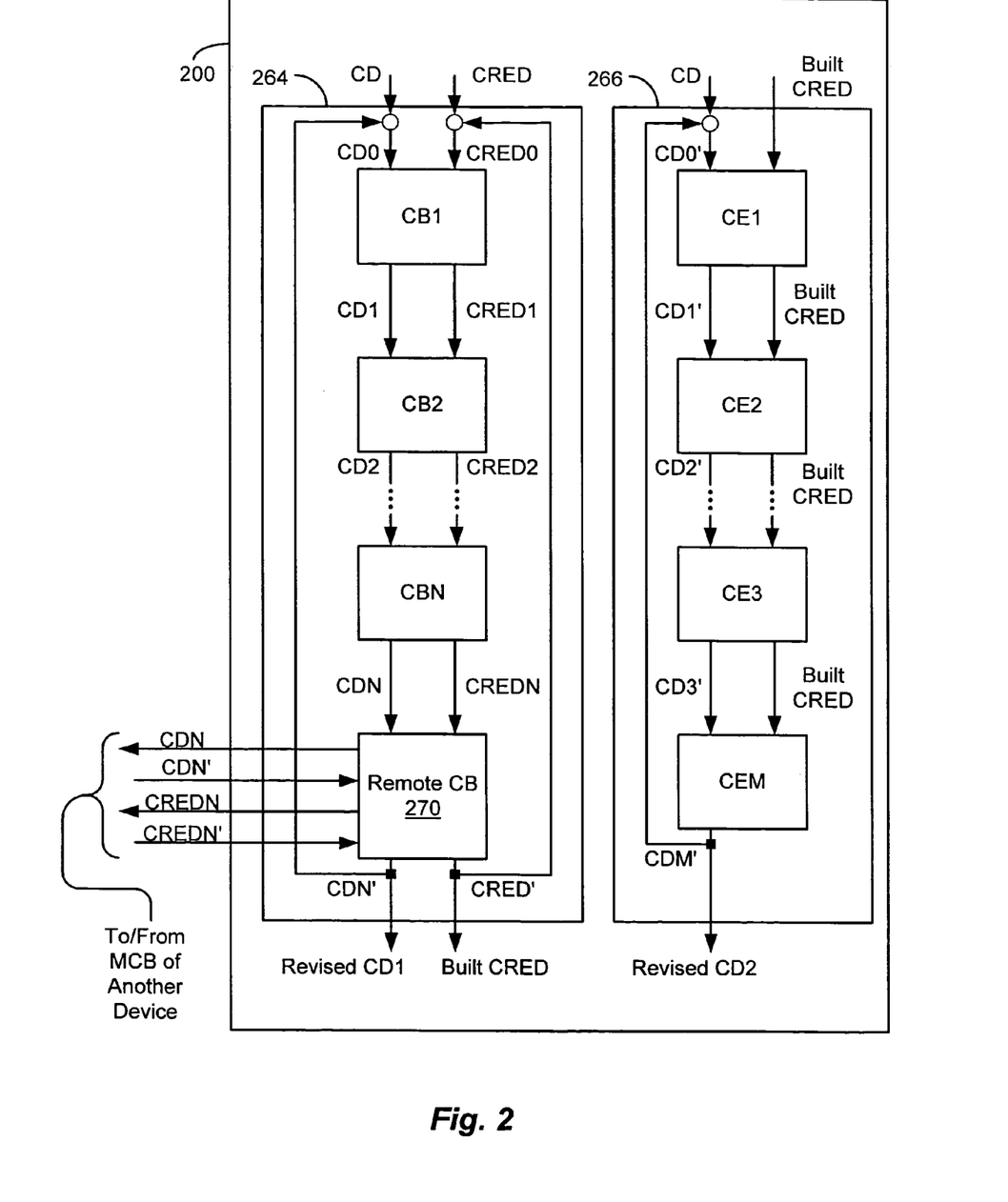
FIG. 2 is a software flow diagram for a representative computer connected to the computer network of FIG. 1, operative in a manner consistent with the present invention.

FIG. 2 depicts a partial block diagram of a software configuration 200 for the computers and other computerized devices connected to the computer network 100. Specifically, the software configuration 200 includes a plurality of software modules such as a master credential builder 264 and a master credential evaluator 266, which are employed for authenticating users of the computers and other computerized devices connected to the computer network 100.

More specifically, the master credential builder 264 preferably includes a plurality of different software sub-modules, e.g., credential builders (CBs) 1 through N, and a remote CB 270; and, similarly, the master credential evaluator 266 preferably includes a plurality of different software sub-modules, e.g., credential evaluators (CEs) 1 through M, wherein the value, N, may or may not be equal to the value, M.

It should be appreciated that each of the client computers 110, 112, 114, and 115, and the server computers 120 and 130, depicted in FIG. 1, may operatively include at least one software module consistent with the master credential builder 264 and the master credential evaluator 266, and/or at least one software sub-module consistent with the CBs 1 through N and the CEs 1 through M, as depicted in FIG. 2.

In a preferred embodiment, each of the client computers 110, 112, 114, and 115, and the server computers 120 and 130 include at least one software module operative in a manner consistent with the master credential builder 264 and the master credential evaluator 266. It should be noted, however, that each and every one of the computers 110, 112, 114, 115, 120, and 130 need not include such software modules.

Although the client computers 110, 112, 114, and 115 and the server computers 120 and 130 preferably include respective master credential builders and/or respective master credential evaluators, it should also be noted that the respective master credential builders and the respective credential evaluators may include different software sub-modules, CB and CE.

The master credential builders and/or the master credential evaluators included in the client computers 110, 112, 114, and 115 and the server computers 120 and 130 can be extended by simply adding one or more CBs and one or more CEs to the master credential builders and the master credential evaluators, respectively. Conversely, CBs and CEs can be removed from the master credential builders and the master credential evaluators, respectively. In this way, the master credential builders and the master credential evaluators can be dynamically modified and adapted to suit specific user authentication requirements of the computer network 100.

For example, CBs and CEs may be added to or removed from a master credential builder and a master credential evaluator, respectively, in response to a predetermined event such as a change in an access control list (ACL) for a requested service/resource. Such a change may result in a new or different credential that needs to be built and evaluated for users seeking to access the service/resource. The master credential builder and the master credential evaluator may therefore be modified to suit this new user authentication requirement by adding an appropriate CB and CE, respectively, thereto.

Specifically, the CBs 1 through N, and the remote CB 270, are preferably serially linked in the master credential builder 264, thereby forming a "chain" of CBs. Similarly, the CEs 1 through M are preferably serially linked in the master credential evaluator 266, thereby forming a chain of CEs. Accordingly, depending upon the specific user authentication requirements of the computer network 100, the master credential builder 264 can be modified by adding (removing) one or more CBs to (from) the chain of CBs included therein. Similarly, the master credential evaluator 266 can be modified by adding (removing) one or more CEs to (from) the chain of CEs included therein.

In addition, user authentication can be performed by way of a negotiated dialogue between two or more computers and/or computerized devices connected to the computer network 100 using the respective master credential builders and the respective master credential evaluators.

As depicted in FIG. 2, inputs to the master credential builder 264 include a credential descriptor (CD) and a set of credentials (CRED); and, outputs of the master credential builder 264 include a revised CD (REVISED_CD1) and a set of built credentials (BUILT_CRED). Further, inputs to the master credential evaluator 266 include CD and the set of built credentials, BUILT_CRED; and, an output of the master credential evaluator 266 includes another revised CD (REVISED_CD2).

Consistent with the systems and techniques of the present invention, a user operating a client computer initiates a connection with a server computer by way of a computer network for accessing a particular service/resource. If access to that service/resource were restricted, then, instead of immediately providing access to the requested service/resource, the server computer generates CD, which describes the set of credentials of the client computer that must be built and subsequently evaluated for authenticating the user before allowing access to that particular service/resource.

For example, a client computer's credentials to a server computer may include a certpath credential used by the server computer for obtaining the "public key" of the client computer; a proof-of-possession credential used by the server computer for confirming that the client computer has possession of a corresponding "private key"; a non-revocation of certificate credential used by the server computer for confirming that the client computer's "certificate" has not been revoked; and/or, a group membership credential used by the server computer for confirming the client computer's membership in a particular group.

It should be appreciated that the client computer's set of credentials to the server computer may include types of credentials that are different from those listed above, and that new types of credentials may subsequently be defined and added to the client computer's set of credentials. Similarly, CDs corresponding to sets of credentials may take different forms. Accordingly, the types of credentials and the ways of describing those credentials for authenticating users of computers and computerized devices connected to the computer network 100 may vary in different systems and applications.

In the preferred embodiment, both the client and server computers include respective master credential builders consistent with the master credential builder 264 for building the set of credentials corresponding to CD.

Further, because the respective master credential builders for the client and server computers may be modified to include different CB sub-modules, the client and server computers preferably build only those credentials of the required set of credentials that they are both willing to build and capable of building. This will be described in greater detail below in reference to illustrative examples for authenticating and authorizing users.

In the presently disclosed embodiment, the server computer first builds those credentials of the required set of credentials that it is both willing to build and capable of building, before the client computer builds any credentials.

Specifically, CD and the set of credentials (CRED) are provided to the sub-module, CB1, of the master credential builder for the server computer. As mentioned above, CD describes the set of credentials of the client computer that must be built for authenticating the user. Further, the set of credentials, CRED, at the input of CB1 is a set of credentials that have already been built, if any. For example, the master credential builder for the server computer may have access to a memory included in the server computer for storing useful built credentials. Accordingly, the set of credentials, CRED, provided to CB1 may either include a set of built credentials or it may be empty.

As mentioned above, the master credential builder 264 preferably includes a plurality of different CB sub-modules, CB1 through CBN. Specifically, each CB sub-module, CB1 through CBN, is used for building a specific type of credential. Accordingly, if the sub-module CB1 were capable of building one of the types of credentials described by CD provided at its input, then it builds that type of credential and then provides a revised credential descriptor, CD1, and a revised set of built credentials, CRED1, to the sub-module CB2, which is the next credential builder in the chain of CBs.

Specifically, CD1 is a credential descriptor describing a set of credentials that remains to be built. For example, CD1 describes all of the types of credentials described by CD, except for the type of credential built by the sub-module CB1, if any. Accordingly, if the sub-module CB1 were incapable of building any of the types of credentials described by CD, then CD1 would be identical to CD.

Further, CRED1 is a revised set of built credentials that not only includes all of the credentials of CRED, but also includes the credential built by the sub-module CB1, if any. If the sub-module CB1 were incapable of building any of the types of credentials described by CD, then CRED1 would be identical to CRED.

Similarly, the sub-modules CB2 through CBN of the master credential builder 264 take a credential descriptor and a set of built credentials provided at their respective inputs, build any type of credential described by the credential descriptor that they are capable of building, and provide a revised credential descriptor and a revised set of built credentials at their respective outputs.

Specifically, CD2 describes all of the types of credentials described by CD1, except for the type of credential built by the sub-module CB2, if any. Further, CRED2 is a set of built credentials that not only includes all of the credentials of CRED1, but also includes the credential built by the sub-module CB2, if any.

Similarly, CDN describes all of the types of credentials described by the credential descriptor at the input of the sub-module CBN, except for the type of credential built by the sub-module CBN, if any. Further, CREDN is a set of built credentials that not only includes all of the credentials of the set of credentials at the input of the sub-module CBN, but also includes the credential built by the sub-module CBN, if any.

As depicted in FIG. 2, the sub-module CBN provides CDN and CREDN to the remote CB 270, which is a software sub-module used in communicating with a master credential builder for another computer or computerized device connected to the computer network 100. For example, that other master credential builder may be included in the client computer for which the set of credentials is currently being built. Alternatively, that master credential builder may be included in a computer or computerized device other than the client and server. In either case, the remote CB 270 enables a negotiated dialogue to be performed between the server computer and another computer or computerized device in the computer network 100 to build a set of credentials for authenticating the user of the client computer.

In this illustrative embodiment, the remote CB 270 is used in communicating with the respective master credential builder of the client computer. Accordingly, using the remote CB 270, the server computer forwards CDN and CREDN to the client computer by way of the computer network 100 for input to the respective master credential builder of the client computer.

The master credential builder of the client computer then operates on CDN and CREDN in a manner similar to that described above for the server computer's master credential builder. Specifically, the client computer provides CDN and CREDN to the first sub-module CB in the chain of CBs included in its master credential builder, the chain of CBs successively builds the types of credentials that each sub-module CB in the chain is capable of building while successively outputting revised CDs and revised sets of built credentials, and then the client computer transmits a revised credential descriptor, CDN', and a revised set of built credentials, CREDN', to the server computer for subsequently inputting CDN' and CREDN' into the remote CB 270 (see FIG. 2).

As depicted in FIG. 2, CDN' and CREDN' can be optionally looped back from the outputs of the remote CB 270 to the inputs of the sub-module CB1 for processing CDN' and CREDN' through the chain of CBs 1 through N of the master credential builder 264, thereby ensuring that CB1 through CBN have built all of the different types of credentials described by CDN' that they are capable of building. Similarly, the remote CB 270 can optionally be used again for providing a revised CD and a revised set of built credentials to the master credential builder of the client computer or other computerized device for additional processing. Finally, if it is determined that additional processing no longer results in further revisions to CD and the set of built credentials, then the credential descriptor and the set of built credentials are provided at the output of the master credential builder 264 as the REVISED_CD1 and the BUILT_CRED, respectively.

It should be appreciated that if the master credential builder of the server computer and/or the master credential builder of the client computer or other computerized device is capable of building all of the credentials required for authenticating the user of the client computer, then the REVISED_CD1 is empty and the BUILT_CRED includes a full set of built credentials corresponding to the credential descriptions included in CD.

In this illustrative embodiment, the set of built credentials, BUILT_CRED, is evaluated for determining whether BUILT_CRED includes all of the credentials corresponding to CD. The BUILT_CRED is preferably evaluated using the master credential evaluator for the server computer, which is consistent with the master credential evaluator 266.

Specifically, CD and the set of built credentials, BUILT_CRED, are provided to the sub-module CE1 of the master credential evaluator. As mentioned above, the master credential evaluator 266 preferably includes a plurality of different CE sub-modules, CE1 through CEN. More specifically, each sub-module CE1 through CEN is used for evaluating a specific type of credential. Accordingly, if the sub-module CE1 is capable of evaluating one of the types of credentials included in the set of built credentials, BUILT_CRED, then it evaluates that type of credential and provides a revised CD, i.e., CD1', and the unchanged BUILT_CRED to the sub-module CE2, which is the next credential evaluator in the chain of CEs.

Specifically, CD1' is a credential descriptor describing a set of credentials that remains to be evaluated. For example, CD1' describes all of the types of credentials described by CD, except for the type of credential successfully evaluated by the sub-module CE1, if any. Accordingly, if the sub-module CE1 were incapable of successfully evaluating any of the types of credentials included in BUILT_CRED, then CD1' would be identical to the CD.

Similarly, the sub-modules CE2 through CEM of the master credential evaluator 266 take a credential descriptor and the set of built credentials, BUILT_CRED, provided at their respective inputs, evaluate any type of credential included in BUILT_CRED that they are capable of evaluating, and then provide a revised CD and the unchanged BUILT_CRED at their respective outputs.

Specifically, CD2' describes all of the types of credentials described by CD1', except for the type of credential successfully evaluated by the sub-module CE2, if any. Similarly, CD3' describes all of the types of credentials described by CD2', except for the type of credential successfully evaluated by the sub-module CE3, if any; and, CDM' describes all of the types of credentials described by the credential descriptor at its input, except for the type of credential successfully evaluated by the sub-module CEM, if any.

As depicted in FIG. 2, CDM' can be optionally looped back from the output of the sub-module CEM to the input of the sub-module CE1 for processing CDM' through the chain of CEs 1 through M of the master credential evaluator 266, thereby ensuring that CE1 through CEM have evaluated all of the different types of credentials described by CDM' that they are capable of evaluating. Finally, if it is determined that additional processing no longer results in further revisions to CDM', then CDM' is provided at the output of the master credential evaluator 266 as REVISED_CD2.

It should be appreciated that if (1) the master credential evaluator 266 were capable of successfully evaluating all of the credentials in the set of built credentials, BUILT_CRED, and (2) BUILT_CRED included credentials corresponding to each credential description included in CD, then the REVISED_CD2 would be empty. In the preferred embodiment, the master credential evaluator is modified to include all of the sub-modules CE1 through CEM that are required for evaluating the credentials described in CD. If it is determined that REVISED_CD2 is empty, then it is concluded that the set of built credentials, BUILT_CRED, satisfies the credential descriptor, CD. The user of the client computer is therefore authenticated/authorized and permitted to access the desired service/resource provided by the server computer.

The embodiments disclosed herein will be better understood with reference to the following illustrative examples. In a first illustrative example, a user (not shown) of the client computer 110 (see FIG. 1) wishes to obtain access to a particular service/resource provided by the server computer 120 (see FIG. 1). As depicted in FIG. 1, the client computer 110 is connected to the network 102, which comprises Group A.

In order to obtain access to the particular service/resource provided by the server computer 120, the user of the client computer 110 transmits a message to the server computer 120 including a request to access that particular service/resource. It should be understood that the manner in which the client computer 110 and the server computer 120 transmit and receive messages is conventional.

In this first illustrative example, after receiving the request from the client computer 110, the server computer 120 retrieves an ACL for the requested service/resource. For example, the ACL may indicate that only an authorized user of client computer 110 in Group A is entitled to access the service/resource. The server computer 120 then converts the information in the ACL to a corresponding credential descriptor, CD.

For example, the corresponding CD may be defined by the following:

cert_path_CD[120→110] AND group_membership_CD[110, A] AND cert_path_CD[120→A] AND non_revocation_CD[cert_110] AND proof_of_possession_CD[110], wherein "cert_path_CD[120→110]" is a certification path CD including the name of a principal (i.e., the server computer 120) with which to start the path and the name of a target (i.e., the client computer 110) that should end the path; "group_membership_CD[110, A]" is a group membership CD including the name of a principal (i.e., the client computer 110) whose group membership is to be established and the name of an issuing group (i.e., Group A) in which the principal's group membership is to be established; "cert_path_CD[120→A]" is a certification path CD including the name of a principal (i.e., the server computer 120) with which to start the path and the name of a target (i.e., Group A) that should end the path; "non_revocation_CD[cert_110]" is a non-revocation of certificate CD including an indication of a principal's certificate (i.e., the certificate of the client computer 110) for which to prove non-revocation; "proof_of_possession_CD[110]" is a proof-of-possession CD including the name of a principal (i.e., the client computer 110) for which to prove possession of a private key; and, "AND" corresponds to a standard Boolean logic operator.

The server computer 120 builds those credentials corresponding to CD that it is both willing to build and capable of building using its master credential builder. For example, even though, in some applications, the server computer 120 may be capable of building all of the credentials that correspond to CD, it may be unwilling to build each and every credential. One possible reason for this is that building a particular credential may cause the server computer 120 to expend too much processing time. Accordingly, because the master credential builder is modifiable, the server computer 120 adds (removes) CB sub-modules to (from) the chain of CBs so that the master credential builder includes only those CB sub-modules that correspond to credentials in CD for which the server computer 120 is both willing to build and capable of building.

For example, the server computer 120 may be both willing to build and capable of building credentials corresponding only with the following credential descriptors: cert_path_CD[120→110] and cert_path_CD[120→A]. Accordingly, the server computer 120 adds (removes) CB sub-modules to (from) the chain of CBs so that the master credential builder includes a certpath CB and a remote CB consistent with the remote CB 270. It should be understood that the server computer 120 may add (remove) CB sub-modules to (from) the chain of CBs as required at anytime during the user authentication process.

Next, CD is provided as an input to the master credential builder for the server computer 120. In this first illustrative example, it is assumed that the set of credentials, CRED, is empty.

Specifically, the server computer 120 builds a first credential corresponding to the credential descriptor, cert_path_CD[120→110]. For example, the server computer 120 may have been provided with the certificate of the client computer 110 by way of a known Certificate Authority (CA), and that certificate may then have been stored in the memory of the server computer 120. Accordingly, the certpath CB of the master credential builder for the server computer retrieves the certificate of the client computer 110 from the memory and builds the corresponding credential, which may include a message indicating the public key of the client computer 110 and a digital signature.

The digital signature may be conventionally generated by applying the above-mentioned message to a predetermined hash function for generating a message digest, which may then be encrypted with the private key of the CA to form the digital signature. It should be understood that various techniques might be used for generating the digital signature such as the well known Rivest, Shamir, and Adelman (RSA) algorithm, the El Gamal signature algorithm (ELGA85), the Digital Signature Standard (DSS) algorithm or any other suitable algorithm for generating a digital signature.

Similarly, the server computer 120 builds a second credential corresponding to the credential descriptor, cert_path_CD[120→A]. For example, the server computer 120 may also have been provided with the certificate of Group A by way of the CA, and that certificate may also have been stored in the memory of the server computer 120. Accordingly, the certification path CB of the master credential builder for the server computer 120 retrieves the certificate of Group A and builds the corresponding credential, which may include a message indicating the public key of Group A and another digital signature, which may be generated in a manner similar to that described above.

The remote CB of the master credential builder for the server computer 120 is then provided with a CD (e.g., CDN; see FIG. 2) that describes all of the credentials remaining to be built, and a set of built credentials (e.g., CREDN; see FIG. 2) that includes the credentials built by the certpath CB of the master credential builder for the server computer 120. Specifically, the credentials remaining to be built include the credentials corresponding to the following CDs:

group_membership_CD[110, A], non_revocation_CD [cert_110], and proof_of_possession_CD[110].

Further, the set of built credentials include the credentials corresponding to the following CDs:

cert_path_CD[120→110], and cert_path_CD[120→A].

In this first illustrative example, the remote CB is used to communicate with a respective master credential builder for the client computer 110. Accordingly, using the remote CB, the server computer 120 transmits CDN (see FIG. 2), which describes all of the credentials remaining to be built, and the set of built credentials, CREDN (see FIG. 2), which includes the credentials built by the certpath CB of the master credential builder for the server computer 120, to the client computer 110 for subsequently inputting CDN and CREDN into the respective master credential builder of the client computer 110. In this way, a negotiated dialogue between the server computer 120 and the client computer 110 is initiated for authenticating the user of the client computer 110.

The client computer 110 then builds those credentials corresponding to CDN that it is both willing to build and capable of building using the master credential builder of the client computer 110. For example, the client computer 110 preferably adds (removes) CB sub-modules to (from) the chain of CBs of the master credential builder of the client computer 110 so that the master credential builder includes only those CB sub-modules that correspond to the group membership credential, the non-revocation of certificate credential, and the proof-of-possession of private key credential. Accordingly, the client computer 110 adds (removes) CB sub-modules to (from) the chain of CBs of the master credential builder of the client computer 110 so that it consists of a group membership CB, a non-revocation of certificate CB, and a proof-of-possession of private key CB. It is understood that the client computer 110 may add (remove) CB sub-modules to (from) the chain of CBs as required at anytime during the user authentication process.

Next, the CDN and the CREDN are provided as inputs to the master credential builder of the client computer 110, and the client computer 110 builds credentials corresponding thereto.

Specifically, the client computer 110 builds a third credential corresponding to the credential descriptor, group_membership_CD[110, A]. For example, the client computer 110 may have been provided with the certificate of Group A by way of the CA, and that certificate may have been stored in a memory of the client computer 110. Accordingly, the group membership CB of the master credential builder for the client computer 110 retrieves the certificate of Group A from the memory and builds the corresponding credential, which may include a message indicating that the client computer 110 is a member of Group A along with an associated digital signature.

The next CB in the chain of CBs, e.g., the non-revocation of certificate CB, is then provided with a CD that describes the credentials remaining to be built, and a set of built credentials. Specifically, the client computer 110 builds a fourth credential corresponding to the credential descriptor, non_revocation_CD[cert_110]. For example, the client computer 110 may again have been provided with the certificate of non-revocation by way of the CA, and that certificate may have been stored in the memory of the client computer 110. Accordingly, the non-revocation of certificate CB retrieves the certificate of non-revocation from the memory and builds the corresponding credential, which may include a message indicating that the certificate of the client computer 110 has not been revoked and an associated digital signature.

Similarly, the next CB in the chain of CBs, e.g., the proof-of-possession of private key CB, is then provided with a CD that describes the credentials remaining to be built, and a set of built credentials. Specifically, the client computer 110 builds a fifth credential corresponding to the credential descriptor, proof_of_possession_CD[110]. For example, the proof-of-possession of private key CB transforms a random challenge, R, using the private key of the client computer 110, i.e., $[R]_{110}$, and builds the corresponding credential, which may include both R and $[R]_{110}$.

The remote CB of the master credential builder for the client computer 110 is then provided with a CD that describes all of the credentials remaining to be built, and a set of built credentials. Because all of the credentials for authenticating the user of the client computer 110 have now been built, the CD provided to the remote CB is empty, and the set of built credentials includes the credentials corresponding to the cert_path_CD[120→110], the group_membership_CD[110, A], the cert_path_CD[120→A], the non_revocation_CD[cert_110], and the proof_of_possession_CD[110]. Accordingly, the client computer 110 transmits an indication of the empty CD and the full set of built credentials to the server computer 120 for subsequently inputting that data into the remote CB of the master credential builder for the server computer 120, thereby continuing the negotiated dialogue between the server computer 120 and the client computer 110 for authenticating the user of the client computer 110.

Because, in this first illustrative example, the client computer 110 provides the server computer 120 with (1) the empty CD, thereby indicating that all of the credentials required for authenticating the user of the client computer have been built, and (2) the full set of built credentials, the server computer 120 provides that full set of built credentials (e.g., BUILT_CRED; see FIG. 2) to the input of the master credential evaluator for the server computer 120.

Because the master credential evaluator is modifiable, the server computer 120 adds (removes) CE sub-modules to (from) the chain of CEs so that the master credential evaluator includes only those CE sub-modules that correspond to the credentials described by the original CD at its input. Accordingly, the chain of CEs includes sub-modules for evaluating certpath credentials, group membership credentials, non-revocation of certificate credentials, and proof-of-possession of private key credentials. It is understood that the server computer 120 may add (remove) CE sub-modules to (from) the chain of CEs as required at anytime during the user authentication process.

Specifically, the master credential evaluator of the server computer 120 evaluates the credentials corresponding to the cert_path_CD[120→110] and the cert_path_CD[120→A]. For example, the certpath CE may apply the above-mentioned hash function to the message indicating the public key of the client computer 110 included in the certpath credential of the client computer 110, thereby producing a message digest related thereto. Further, the certpath CE may decrypt the digital signature associated with that message using the public key of the CA, thereby producing another message digest. The certpath CE may then compare the two (2) message digests. If neither the message nor the digital signature associated therewith have been modified, then the result of the comparison is that the two (2) message digests are the same. This indicates to a virtual certainty that the message was in fact generated by the CA holding the private key associated with the public key used to decrypt the digital signature, and that the message indicating the public key of the client computer 110 has not been modified. In this way, the integrity of the message indicating the public key of the client computer 110 can be maintained. Accordingly, the credential corresponding to the cert_path_CD[120→110] is successfully evaluated. Further, the certpath CE evaluates the certpath credential for Group A in a similar manner.

The next CE in the chain of CEs, e.g., the group membership CE, is then provided with a CD that describes the credentials remaining to be evaluated, and the set of built credentials. Specifically, the master credential evaluator of the server computer 120 evaluates the credential corresponding to the group_membership_CD[110, A], which includes the message indicating that the client computer 110 is a member of Group A and the associated digital signature. For example, the group membership CE may evaluate that credential in a manner similar to that described above for evaluating the certification path credentials.

Further, the next CE in the chain of CEs, e.g., the non-revocation of certificate CE, is provided with a CD describing the credentials remaining to be evaluated along with the set of built credentials. Specifically, the master credential evaluator for the server computer 120 evaluates the credential corresponding to the non_revocation_CD[cert_110], which includes the message indicating that the certificate of the client computer 110 has not been revoked and the associated digital signature. The non-revocation of certificate CE may also evaluate that credential in a manner similar to that described above for evaluating the certpath credentials.

Finally, the next CE in the chain of CEs, e.g., the proof-of-possession of private key CE, is provided with a CD describing the credentials remaining to be evaluated, and the set of built credentials. Specifically, the master credential evaluator for the server computer 120 evaluates the credential corresponding to the proof_of_possession_CD[110], which includes a random challenge, R, and R transformed by the private key of the client computer 110, $[R]_{110}$. For example, the proof-of-possession of private key CE may evaluate $[R]_{110}$ using the public key of the client computer 110 for determining whether the result of the evaluation matches R. If so, then the proof-of-possession CD is successfully evaluated, and there are no more credentials remaining to be evaluated. Accordingly, the user of the client computer 110 is authenticated and authorized for accessing the desired service/resource provided by the server computer 120, and access to the service/resource is limited to authenticated and authorized users.

In a second illustrative example, the user of the client computer 110 wishes to obtain access to a particular service/resource provided by the server computer 130 (see FIG. 1). As depicted in FIG. 1, the server computer 130 is connected to the network 104, which is coupled to the network 102 by the gateway computer 140.

In this second illustrative example, it is assumed that the gateway computer 140 blocks the server computer 130 from obtaining the certificate of the client computer 110. The server computer 130 is therefore incapable of building a certpath from the server computer 130 to the client computer 110.

It is further assumed that the server computer 130 is capable of building a certpath from the server computer 130 to the gateway computer 140; and, the client computer 110 is capable of building a certpath from the gateway computer 140 to the client computer 110. It is still further assumed that the client computer 110 and the server computer 130 are both willing to build these certpath credentials.

Accordingly, the CD describing credentials required for accessing the desired service/resource provided by the server computer 130 includes at least the credential descriptor, cert_path_CD[130→110]. Further, both the master credential builders for the client computer 110 and the server computer 130 are extended, if necessary, by adding certpath CBs to their respective chains of CBs.

As in the first illustrative example, the server computer 130 builds credentials corresponding to cert_path_CD [130→110], before the client computer 110 attempts to build credentials. Accordingly, the certpath CB of the server computer 130 builds the certpath credential from the server computer 130 to the gateway computer 140, which only partially satisfies the cert_path_CD[130→110].

Because the credential descriptor, cert_path_CD [130→110], remains to be built, the server computer 130 subsequently transmits that CD along with any other CDs remaining to be built, and a current set of built credentials including the certpath credential from the server computer 130, to the gateway computer 140, and to the client computer 110 using the remote CB of the master credential builder for the server computer 130, thereby initiating a negotiated dialogue between the server computer 130 and the client computer 110 for authenticating the user of the client computer 110.

Next, the client computer 110 similarly builds credentials corresponding to cert_path CD[130→110] Accordingly, the certpath CB for the client computer 110 builds the certpath credential from the gateway computer 140 to the client computer 110, which also only partially satisfies the cert_path_CD[130→110].

However, because the client computer 110 received the certpath credential from the server computer 130 to the gateway computer 140 from the server computer 130, the client computer 110 has a complete chain of certificates from the server computer 130 to the client computer 110 and can therefore build the required credential corresponding to the cert_path_CD[130→110]. The client computer 110 then transmits that credential along with any other credential it is willing to build and capable of building, to the server computer 130 for subsequent evaluation by the master credential evaluator of the server computer 130. These credentials are then evaluated in a manner similar to that described in the first illustrative example.

Figure 3:
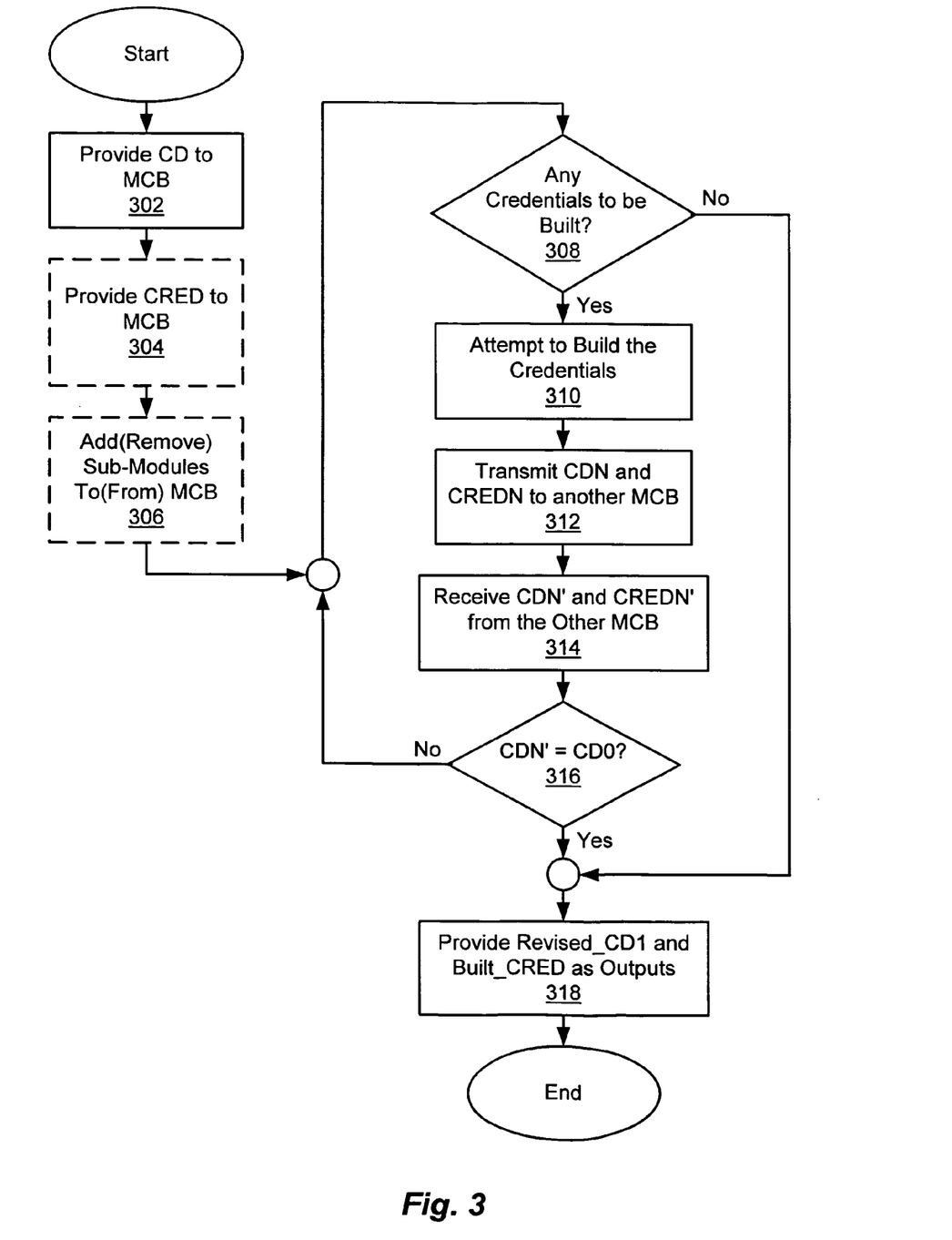
FIG. 3 is a flow diagram depicting an exemplary method of operation for the master credential builder depicted in FIG. 2.

A method of operation of the master credential builder 264 consistent with the present invention is illustrated by reference to FIG. 3. First, a CD is provided, as depicted in step 302, to the master credential builder 264, thereby describing credentials required for authenticating a user. Next, a set of credentials, CRED, is optionally provided, as depicted in step 304, to the master credential builder 264. CB sub-modules are then optionally added (removed), as depicted in step 306, to (from) the chain of CBs included in the master credential builder 264 for ensuring that the master credential builder 264 includes CBs for building at least some of the credentials described in the CD provided in step 302.

Next, a decision is made, as depicted in step 308, as to whether there are any credentials to be built. If so, then, using the chain of CBs, the master credential builder 264 attempts to build, as depicted in step 310, credentials corresponding to credentials described in the CD provided in step 302. Otherwise, the master credential builder 264 provides, as depicted in step 318, the revised CD (Revised_CD1) and the revised set of built credentials (Built_CRED) as outputs.

The master credential builder 264 then transmits, as depicted in step 312, a CDN indicating credentials that remain to be built, if any, and a set of built credentials, CREDN, to another master credential builder. Next, the master credential builder 264 receives, as depicted in step 314, a revised CDN' indicating credentials that remain to be built, if any, and a revised set of built credentials, CREDN', from the other master credential builder. As depicted in step 316, a decision is then made as to whether the revised CDN' matches the credential descriptor, CD0, provided at the start of the chain of CBs. If not, then some progress has been made in building credentials to satisfy the CD provided in step 302; and, the method loops back to step 308 to determine whether there are any more credentials remaining to be built. Otherwise, it is concluded that no more credentials can be built to satisfy the CD provided in step 302, and the master credential builder 264 provides, as depicted in step 318, the revised CD (Revised_CD1) and the revised set of built credentials (Built_CRED) as outputs.

Figure 4:
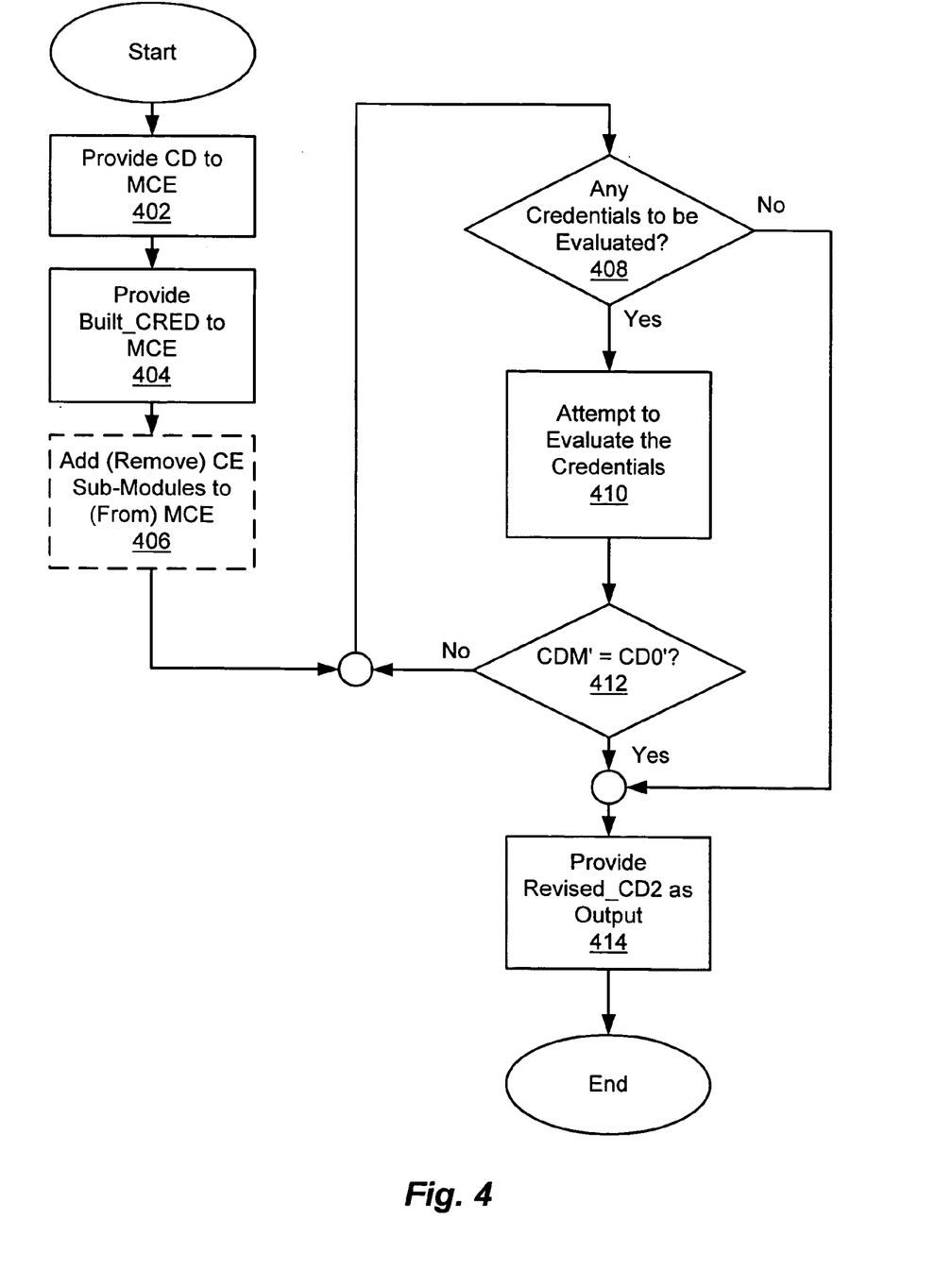
FIG. 4 is a flow diagram depicting an exemplary method of operation for the master credential evaluator depicted in FIG. 2.

A method of operation of the master credential evaluator 266 consistent with the present invention is illustrated by reference to FIG. 4. First, the CD is provided, as depicted in step 402, to the master credential evaluator 266, thereby describing credentials required for authenticating the user. The set of built credentials, Built_CRED, is then provided, as depicted in step 404, to the master credential evaluator 266, thereby indicating the credentials previously built by the master credential builder 264.

Next, CE sub-modules are optionally added (removed), as depicted in step 406, to (from) the chain of CEs included in the master credential evaluator 266 for ensuring that the master credential evaluator 266 includes CEs for evaluating all of the credentials described in the CD provided in step 402. As depicted in step 408, a decision is then made as to whether there are any credentials to be evaluated. If so, then the master credential evaluator 266 attempts to evaluate, using the chain of CEs, as depicted in step 410, credentials corresponding to the set of built credentials provided in step 404, with reference to the credentials described in the CD provided in step 402. Otherwise, the master credential evaluator 266 provides, as depicted in step 414, the revised CD (Revised_CD2) as output.

As depicted in step 412, a decision is then made as to whether the revised CDM' matches the credential descriptor, CD0', provided at the start of the chain of CEs. If not, then some progress has been made in evaluating the credentials, Built_CRED, provided in step 404; and, the method loops back to step 408 to determine whether there are any more credentials remaining to be evaluated. Otherwise, it is concluded that no more credentials can be evaluated, and the master credential evaluator 266 provides, as depicted in step 414, the revised CD (Revised_CD2) as output.

Those of ordinary skill in the art will appreciate that computer programs for performing the presently described functions can be delivered to a computer or other computerized device in many forms; including, but not limited to: (a) information permanently stored on non-writable storage media (e.g., read-only memory devices within a computer such as ROM or CD-ROM disks readable by a computer I/O attachment); (b) information alterably stored on writable storage media (e.g., floppy disks, tapes, read/write optical media and hard drives); or, (c) information conveyed to a computer through a communication media, for example, using baseband signaling or broadband signaling techniques, such as over computer or telephone networks via a modem.

In addition, while in this illustrative embodiment the functions are illustrated as being software-driven and executable out of a memory by a processor, the presently described functions may alternatively be embodied in part or in whole using hardware components such as custom or semi-custom integrated circuits including Application Specific Integrated Circuits (ASICs), state machines, controllers or other hardware components or devices, or a combination of hardware components and software.

Those of ordinary skill in the art should further appreciate that variations to and modification of the above-described methods and apparatus for authenticating and authorizing users of computers and other computerized devices connected to a network may be made without departing from the inventive concepts disclosed herein. Accordingly, the present invention should be viewed as limited solely by the scope and spirit of the appended claims.

What is claimed is:

1. A method of attempting to build credentials for a user of a device connected to a network, the method comprising:
providing, to a first credential builder included in a first device connected to the network, a first credential descriptor that describes a plurality of credentials;
configuring the first credential builder based on the first credential descriptor to build at least one of the credentials described by the first credential descriptor;
using the first credential builder to attempt to build the at least one credential described by the first credential descriptor;
sending a second credential descriptor that describes at least one credential described in the first credential descriptor, but not built by the first credential builder from the first credential builder to a second credential builder included in a second device connected to the network;
configuring the second credential builder based on the second credential descriptor to build at least one of the credentials described by the second credential descriptor; and
using the second credential builder to attempt to build the at least one credential described by the second credential descriptor.

2. The method of claim 1 further including:
providing the credentials built using the first and second credential builders to a credential evaluator included in the first device or the second device; and
evaluating the built credentials by using the credential evaluator to determine whether the built credentials satisfy the first credential descriptor for the device.

3. The method of claim 1 further including:
providing the credentials built using the first and second credential builders to a credential evaluator included in a device connected to the network that is different from the first and second devices; and
evaluating the built credentials by using the credential evaluator to determine whether the built credentials satisfy the first credential descriptor for the device.

4. The method of claim 1 further including:
sending a third credential descriptor that describes at least one credential not built in the second building step from the second credential builder to the first credential builder; and
attempting to build credentials corresponding thereto by using the first credential builder.

5. The method of claim 1 further including:
sending a third credential descriptor that describes at least one credential not built by using either the first or the second credential builder from the second credential builder to a third credential builder included in a device connected to the network that is different from the first and second devices; and
using the third credential builder to attempt to build at least one credential described by the third credential descriptor.

6. The method of claim 1 further including generating the first credential descriptor for the device.

7. A method of attempting to build credentials for a user of a device, the method comprising
providing a master credential descriptor including at least one credential descriptor to a master credential builder that includes a plurality of credential builders, each of which:
  A) is associated with a respective credential type;
  B) takes an input that includes an input set of credentials and an input credential descriptor that describes at least one credential to be built;
  C) attempts to build a given credential described by the credential builder if the given credential is of the credential type associated with that credential builder; and
  D) generates an output that includes:
    i) an output set of credentials that includes the input set of credentials as well as any credential that that credential builder has been successful in building; and
    ii) an output credential descriptor that describes each credential described by the input credential descriptor that that credential builder has not been successful in building,
the credential builders being dynamically selected based on credential descriptors in the master credential descriptor and being linked in a series based on credential descriptors in the master credential descriptor in such a manner that the input credential descriptor and set of credentials of each credential builder but the first credential builder in the series include the output credential descriptor and set of credentials of the preceding credential builder; and
employing the master credential builder to attempt to build at least one credential described by the master credential descriptor.

8. The method of claim 7 wherein, if the master credential builder has built credentials as a result of having attempted to build credentials, the method further includes:
providing the credentials built by using the master credential builder to a master credential evaluator that includes a plurality of credential evaluators for evaluating a corresponding plurality of different types of credentials for the device; and
using the master credential evaluator to evaluate the credentials provided thereto to determine whether those credentials satisfy the credential descriptor for the device.

9. The method of claim 7 further including generating the credential descriptor for the device.

10. A method of attempting to build credentials for a user of a device, the method comprising:
providing a master credential descriptor including at least one credential descriptor to a master credential builder, the master credential builder including at least one credential builder that:
  A) is associated with a respective credential type;
  B) takes an input that includes an input set of credentials and an input credential descriptor that describes at least one credential to be built;

C) attempts to build a given credential described by the credential builder if the given credential is of the credential type associated with that credential builder; and D) generates an output that includes:
  i) an output set of credentials that includes the input set of credentials as well as any credential that that credential builder has been successful in building; and
  ii) an output credential descriptor that describes each credential described by the input credential descriptor that that credential builder has not been successful in building;

dynamically adding at least one different credential builder to the master credential builder based on credential descriptors in the master credential descriptor to form a modified master credential builder in such a manner that the credential builders are so linked in a series that the input credential descriptor and set of credentials of each credential builder but the first credential builder in the series include the output credential descriptor and set of credentials of the preceding credential builder; and using the modified master credential builder to attempt to build credentials corresponding to at least one of the plurality of credential descriptors.

11. The method of claim 10 further including generating the credential descriptor for the device.

12. The method of claim 10 further including:
providing the credentials built by the modified master credential builder to a master credential evaluator;
forming a modified master credential evaluator by adding to the master credential evaluator different credential evaluators corresponding to at least a portion of the credentials provided in the master credential descriptor to the master credential evaluator; and
evaluating the credentials corresponding to at least one of the credential evaluators by using the modified master credential evaluator.

13. The method of claim 12 further including removing credential evaluators that do not correspond to at least one of the credentials from the master credential evaluator.

14. A method of attempting to build credentials for a user of a device, the method comprising:
providing a master credential descriptor including at least one credential descriptor to a master credential builder, the master credential builder including a plurality of credential builders, each of which:

A) is associated with a respective credential type;
B) takes an input that includes an input set of credentials and an input credential descriptor that describes at least one credential to be built;
C) attempts to build a given credential described by the credential builder if the given credential is of the credential type associated with that credential builder; and
D) generates an output that includes:
  i) an output set of credentials that includes the input set of credentials as well as any credential that that credential builder has been successful in building; and
  ii) an output credential descriptor that describes each credential described by the input credential descriptor that that credential builder has not been successful in building, the credential builders being linked in a series in such a manner that the input credential descriptor and set of credentials of each credential builder but the first credential builder in the series include the output credential descriptor and set of credentials of the preceding credential builder;

dynamically removing at least one of the credential builders from the master credential builder based on the credential descriptors in the master credential descriptor to form a modified master credential builder; and using the modified master credential builder to attempt to build credentials corresponding to at least one of the credentials described by the credential descriptor.

15. An apparatus used to attempt to build credentials for a user of a device connected to a network, comprising:
means for generating for the device a first credential descriptor that describes a plurality of credentials;
means for providing the first credential descriptor to a first credential builder;
means for configuring the first credential builder based on the first credential descriptor to build at least one of the credentials described by the first credential descriptor;
means for using the first credential builder to build the at least credential described by the first credential descriptor;
means for sending to a second credential builder a second credential descriptor that describes at least one credential described in the first credential descriptor, but not built by the first credential builder;
means for configuring the second credential builder based on the second credential descriptor to build at least one of the credentials described by the second credential descriptor; and
means for using the second credential builder to build at the least one credential described by the second credential descriptor;
wherein the first credential builder and the second credential builder are included in different devices connected to the network.

16. A method of evaluating credentials for a user of a device, comprising:
providing a master credential descriptor and a plurality of credentials for the device to a master credential evaluator including a plurality of credential evaluators, each of which:

A) is associated with a respective credential type;
B) takes an input that includes an input set of at least one credential and an input credential descriptor that describes at least one credential to be evaluated;
C) attempts to evaluate a given credential in the input set if the given credential is described by the credential descriptor and is of the credential type associated with that credential evaluator; and
D) generates an output that includes the input set of credentials and an output credential descriptor that describes each credential that is described by the input credential descriptor but has not successfully been evaluated by that credential evaluator, the credential evaluators being dynamically selected based on the master credential descriptor and being linked in a series in such a manner that the input credential descriptor and set of credentials of each credential evaluator but the first credential evaluator in the series include the output credential descriptor and set of credentials of the preceding credential evaluator; and evaluating the plurality of credentials by using the master credential evaluator to determine whether the plurality of credentials satisfies the master credential descriptor.

17. A method of evaluating credentials for a user of a device, comprising the steps of:
- providing a master credential descriptor and a plurality of credentials for the device to a master credential evaluator including at least one credential evaluator, each of which:
  - A) is associated with a respective credential type;
  - B) takes an input that includes an input set of at least one credential and an input credential descriptor that describes at least one credential to be evaluated;
  - C) attempts to evaluate a given credential in the input set if the given credential is described by the credential descriptor and is of the credential type associated with that credential evaluator; and
  - D) generates an output that includes the input set of credentials and an output credential descriptor that describes each credential that is described by the input credential descriptor but has not successfully been evaluated by that credential evaluator;
- forming a modified credential evaluator by dynamically adding at least one credential evaluator to the master credential evaluator based on the master credential descriptor in such a manner that the credential evaluators are so linked in a series that the input credential descriptor and set of credentials of each credential evaluator but the first credential evaluator in the series include the output credential descriptor and set of credentials of the preceding credential evaluator; and
- evaluating at least one of the credentials by using the modified master credential evaluator to determine whether the at least one credential satisfies the master credential descriptor.

18. A method of evaluating credentials for a user of a device, comprising the steps of:
- providing a master credential descriptor and a plurality of credentials for the device to a master credential evaluator including a plurality of credential evaluators, each of which:
  - A) is associated with a respective credential type;
  - B) takes an input that includes an input set of at least one credential and an input credential descriptor that describes at least one credential to be evaluated;
  - C) attempts to evaluate a given credential in the input set if the given credential is described by the credential descriptor and is of the credential type associated with that credential evaluator; and
  - D) generates an output that includes the input set of credentials and an output credential descriptor that describes each credential that is described by the input credential descriptor but has not successfully been evaluated by that credential evaluator,
- the credential evaluators being linked in a series in such a manner that the input credential descriptor and set of credentials of each credential evaluator but the first credential evaluator in the series include the output credential descriptor and set of credentials of the preceding credential evaluator;
- dynamically removing at least one of the credential evaluators from the master credential evaluator based on the master credential descriptor to form a modified master credential evaluator; and
- evaluating at least one of the credentials by using the modified master credential evaluator to determine whether the at least one credential satisfies the master credential descriptor.

* * * * *